Figure 5:
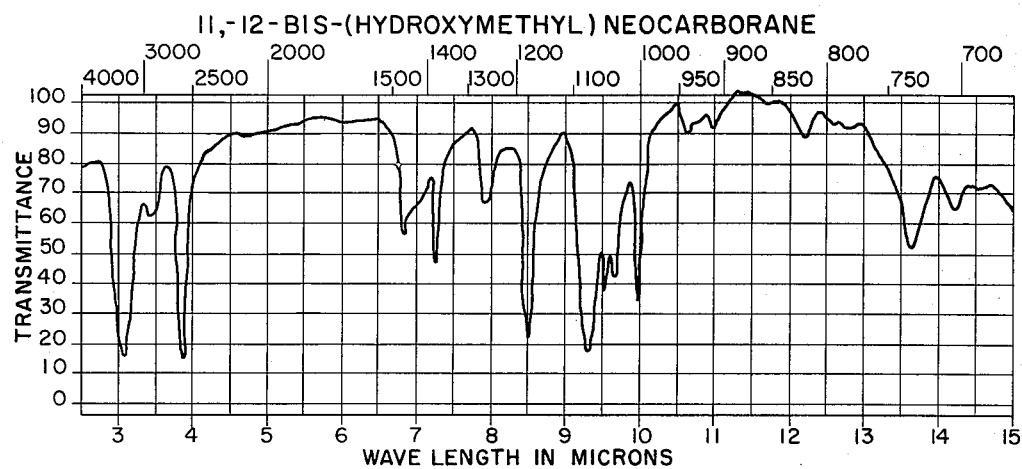

Dec. 28, 1965 D. GRAFSTEIN ETAL 3,226,429
BORON COMPOUNDS AND METHOD FOR MAKING THE SAME
Filed March 20, 1961 4 Sheets-Sheet 1
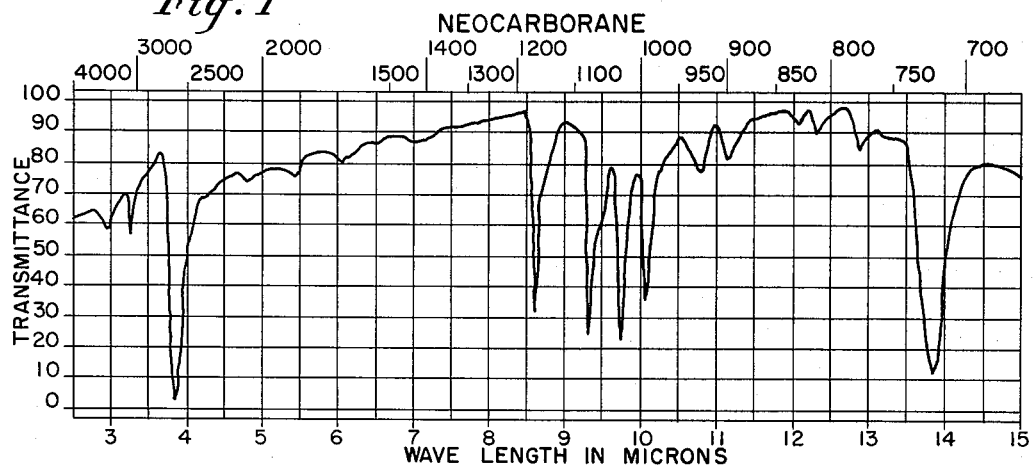
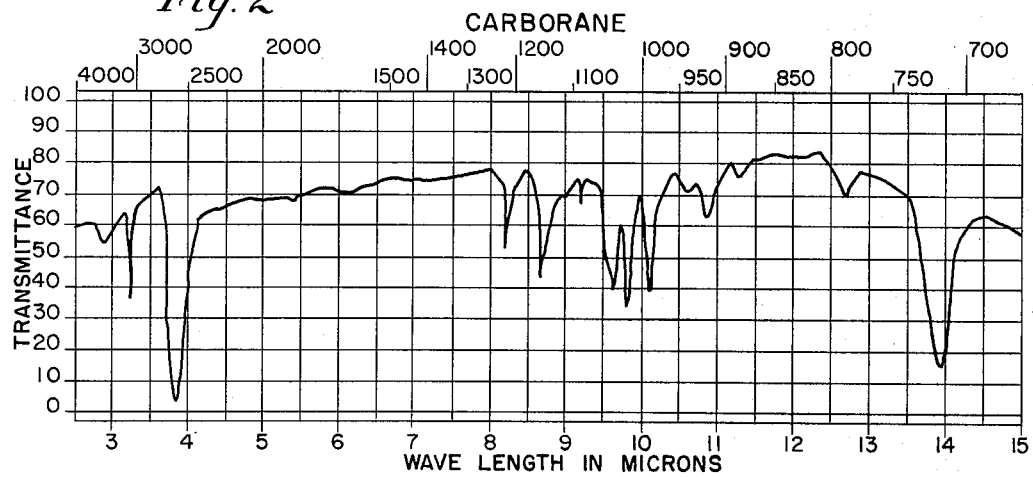
INVENTORS
JOSEPH J. DVORAK
DANIEL GRAFSTEIN
BY
Gordon K. Lister
ATTORNEY

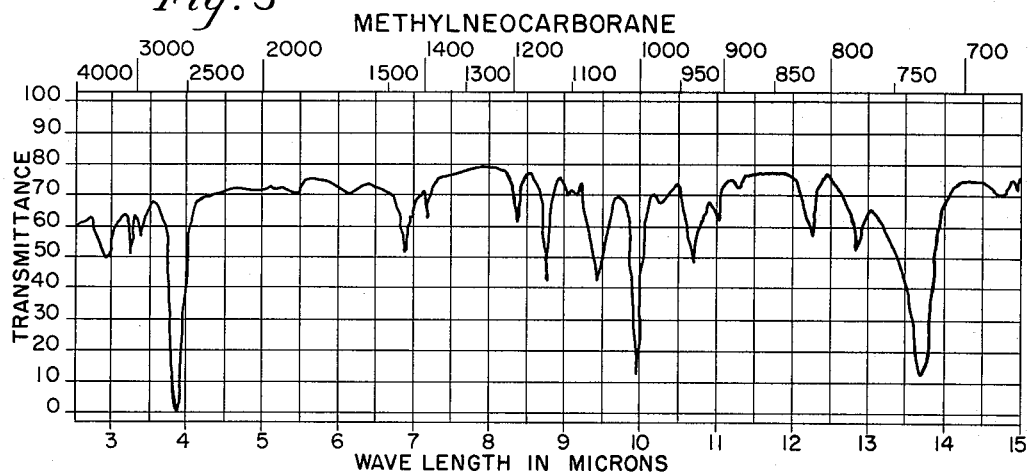
Fig. 3 METHYLNEOCARBORANE
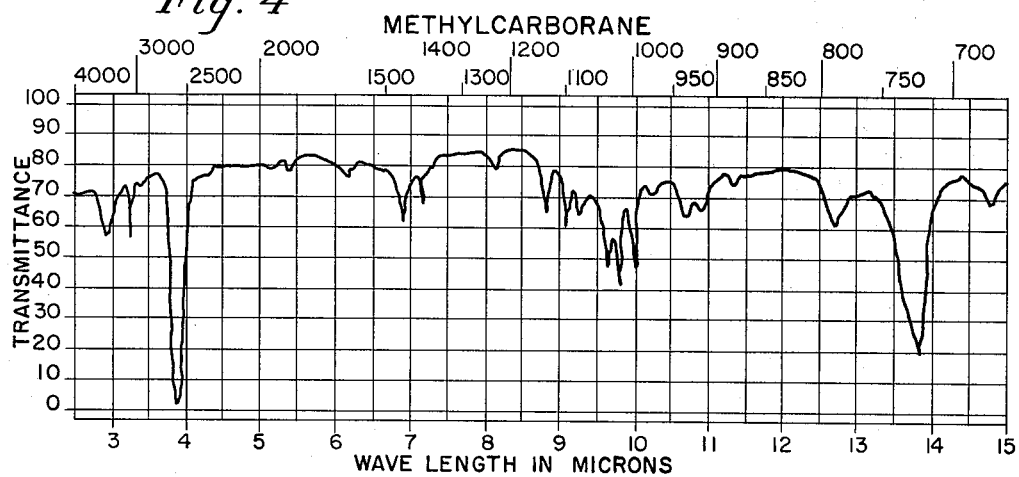
Fig. 4 METHYLCARBORANE
INVENTORS
JOSEPH J. DVORAK
DANIEL GRAFSTEIN
BY
Gordon K. Lister
ATTORNEY Dec. 28, 1965     D. GRAFSTEIN ETAL     3,226,429
BORON COMPOUNDS AND METHOD FOR MAKING THE SAME
Filed March 20, 1961     4 Sheets-Sheet 3

INVENTORS
JOSEPH J. DVORAK
DANIEL GRAFSTEIN
BY

Gordon K. Lister

ATTORNEY

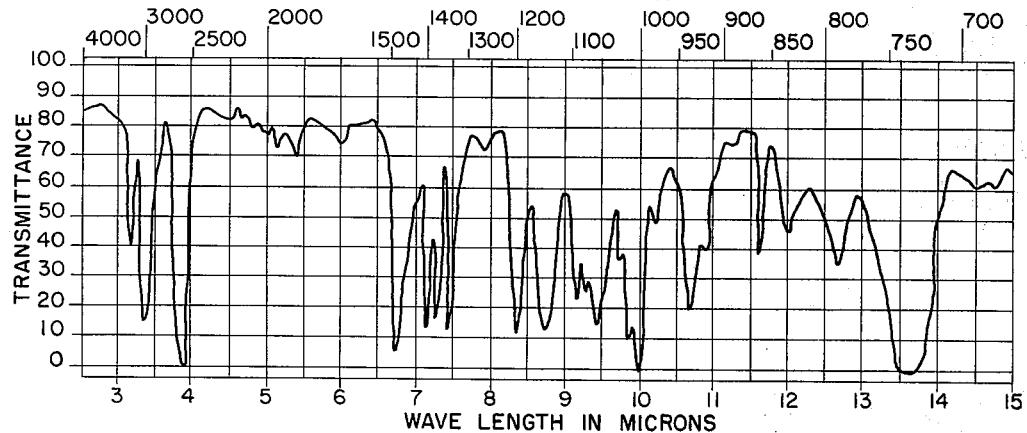
Fig. 7 ISOPROPYLNEOCARBORANE
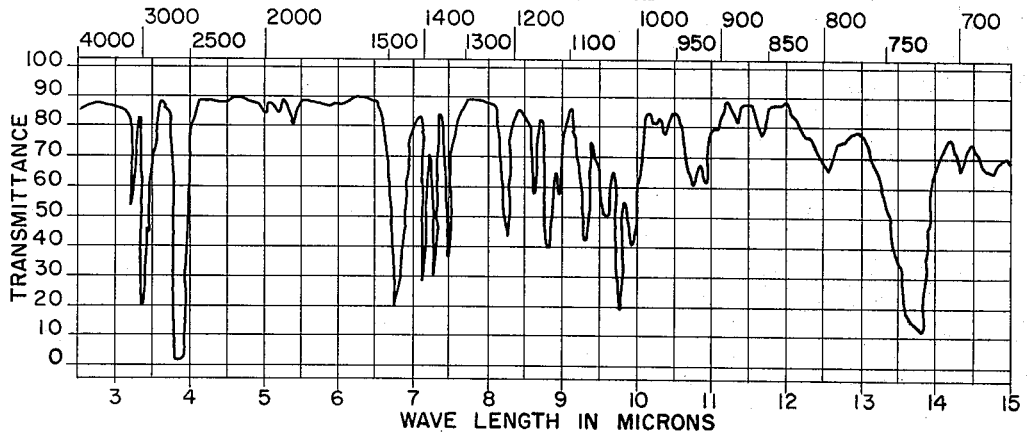
Fig. 8 ISOPROPYLCARBORANE
INVENTORS
JOSEPH J. DVORAK
DANIEL GRAFSTEIN
BY
Gordon K. Lister
ATTORNEY

United States Patent Office 3,226,429
Patented Dec. 28, 1965

3,226,429
BORON COMPOUNDS AND METHOD FOR
MAKING THE SAME
Daniel Grafstein, Morristown, and Joseph J. Dvorak,
Rockaway, N.J., assignors to Thiokol Chemical Corporation, Bristol, Pa., a corporation of Delaware
Filed Mar. 20, 1961, Ser. No. 97,098
15 Claims. (Cl. 260—485)

This invention relates to organoboranes and more particularly to a new class of compounds referred to herein as neocarboranes and to methods of making such neocarboranes.

In connection with the work that has been done in recent years to develop compounds of boron for use in high energy fuels, one of the most interesting compounds that has been discovered is carborane which is a compound of carbon, hydrogen and boron having the empirical formula $C_2H_{12}B_{10}$. Carborane is a solid material melting at 287° to 288° C. It is characterized by a suprisingly stable nuclear structure and two labile hydrogen atoms one connected to each carbon atom which may be conveniently indicated by using the formula $H\ominus H$ to represent this compound. While there is some difference of opinion as to the molecular structure of carborane, its stability is usually attributed to a basket-shaped molecular configuration in which the 10 boron atoms and 2 carbon atoms may be arranged at the apices of an icosahedron.

It is known that the hydrogen atoms of $H\ominus H$ can be replaced by a variety of substituent groups to produce a family of compounds incorporating the carborane nucleus. For example, bis-hydroxy alkyl derivatives of carborane have been made and condensed with dicarboxylic acids to produce polymers useful as heat-transfer media and fuel binders for solid propellant. Bis-carboxyl derivatives of carborane have been made and converted to polyester polymers useful for similar purposes. Moreover, carborane can be used per se as a high energy fuel constitutent.

It has now been found that there is an isomer of carborane which has distinctly different properties from carborane, and which can be used as a basis for making a family of novel compounds which are similar to corresponding carborane derivatives, but which in a number of cases differ significantly in their properties from the corresponding carborane derivatives. This novel isomer of carborane is called "neocarborane" in the present specification and claims and is represented by the formula $H\oplus H$. Being an isomer it has, of course, the same empirical formula as carborane.

More particularly it has been found that when carborane is heated to an elevated temperature under the conditions set forth below, it is converted into a solid isomer having a melting point of 264° to 266° C., i.e. about 20° below that of carborane. Isomerization is preferably effected by heating the carborane in an autoclave in a nitrogen atmosphere and under autogenous pressure at a temperature of 400° to 500° C. Acceptable yields are achieved under these conditions in a period of one to two days. Mixtures of carborane and neocarborane can be readily separated by means of vapor phase chromatography. Alkyl carborane e.g., methyl and isopropyl carboranes, can be converted under similar conditions to alkyl neocarboranes.

While as pointed out above, certain of neocarborane derivatives have properties that are distinctly different from the corresponding carborane derivatives, there are some cases in which the isomeric carborane and neocarborane derivatives have closely similar chemical and physical properties. In general, therefore, the carborane and neocarborane isomers can be most reliably distinguished by the use of infra-red spectographic techniques. To illustrate this method of distinguishing between the isomers, the accompanying drawings have been included which show the infra-red spectra of a number of the compounds referred to herein.

Figure 6:
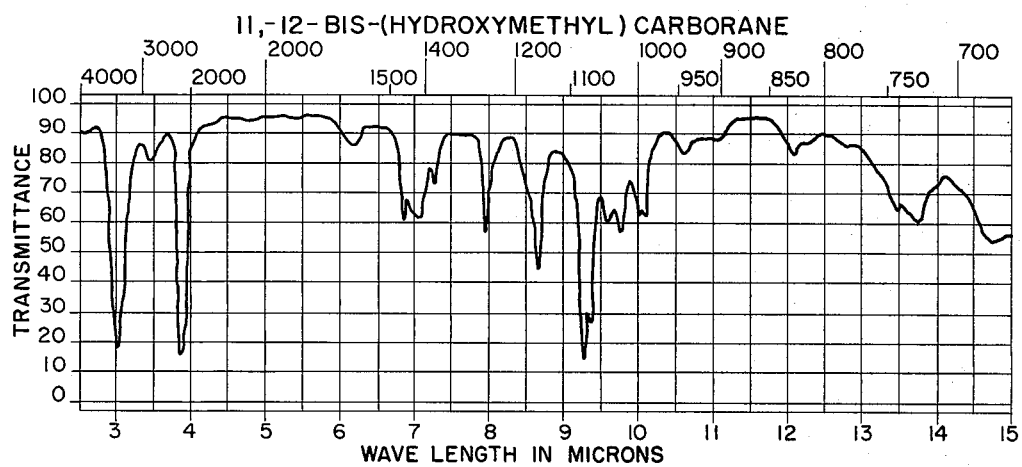

In the drawings, FIGURES 1 and 2 show the infra-red spectra of neocarborane and carborane respectively; FIGURES 3 and 4 show the infra-red spectra of methylneocarborane and methylcarborane respectively; FIGURES 5 and 6 show the infra-red spectra of 11,12-bis(hydroxymethyl) neocarborane and 11,12-bis(hydroxymethyl) carborane respectively; and FIGURES 7 and 8 show the infra-red spectra of isopropylneocarborane and isopropyl carborane respectively. In all figures of the drawings the lower abscissa scale is wave length in microns, the upper abscissa scale is wave number, and the ordinate scale is transmittance i.e., the percent of radiation transmitted at each wave length.

A large number of derivatives of neocarborane can be prepared by replacement of one or both of the active hydrogens thereof. While such replacement can be achieved in a variety of ways, it has been found particularly convenient to form lithium derivatives as intermediate products in accordance with one of the following equations.

(1) $\quad H\oplus H + C_4H_9Li \rightarrow H\oplus Li + C_4H_{10}$
(2) $\quad H\oplus H + 2C_4H_9Li \rightarrow Li\oplus Li + 2C_4H_{10}$ The 11-lithium neocarborane and 11,12-dilithium neocarborane formed in these reactions behave as typical organo metallic reagents and hence can be used as the basis for preparing a wide variety of mono- and di-substituted neocarboranes. For example, 11-lithium neocarborane reacts with alkyl halides to form alkyl neocarboranes in accordance with the following equation.

(3) $\quad H\oplus Li + RI \rightarrow H\oplus R + LiI$

For a number of the applications of these boron compounds as outlined above, it is desirable to use polymeric products containing a high proportion of boron. To prepare such polymers difunctional borane monomers are required and such monomers can be prepared from neocarborane by the reactions illustrated in Equations 4 and 5.

(4) $\quad Li\oplus Li + (CH_2O)_x + 2HX \rightarrow HOCH_2\oplus CH_2OH + 2LiX$
(5) $\quad Li\oplus Li + 2CO_2 + 2HX \rightarrow HOOC\oplus COOH + 2LiX$ In accordance with Equation 4, the dilithium derivative of neocarborane is reacted with paraformaldehyde and acidified to yield a bis-hydroxymethyl derivative which can then be condensed with dicarboxylic acids to form linear polyesters containing a high proportion of boron. In accordance with Equation 5 the dilithium derivative of neocarborane is reacted with carbon dioxide and acidified to yield a dicarboxyl derivative of neocarborane which can be condensed with dihydric alcohols such as glycol and the like to form linear polyesters containing a high proportion of boron. Detailed procedures for preparing such compounds are given in the specific examples below.

The 11,12-neocarboranyl dicarboxylic acid prepared according to Equation 5 differs in reactivity from the corresponding carborane derivative, 11,12-carboranyl dicarboxylic acid, in that the latter compound cannot be esterified by direct reaction with alcohols. The neocarborane derivative reacts with aliphatic alcohols to form diesters in accordance with the following equation.

(6) $\quad HOOC\oplus COOH + 2ROH \rightarrow RO_2C\oplus CO_2R + 2H_2O$

The ability of 11,12-neocarboranyl dicarboxylic acid to undergo direct esterification with alcohols makes it useful for the preparation of polyesters and polyamides by condensation with dihydric alcohols and diamines respectively. Such polyesters, since they contain neocarboranyl units in the polymer chain, have a high boron content.

Monofunctional neocarboranes can be prepared by analogous procedures. Thus 11-methyl neocarborane reacts with butyllithium to form 11-methyl, 12-lithium neocarborane according to the following equation.

(7) 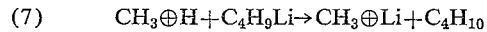

Carbonation of this lithium reagent with carbon dioxide and subsequent acidification gives 11-methyl, 12-neocarboranyl carboxylic acid as indicated by Equation 8.

(8) 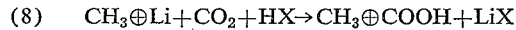

Neocarborane and its derivatives differ from carborane and carborane derivatives in various respects. For example, neocarborane is considerably more stable to chemical attack than is carborane. Thus neocarborane does not react with piperidine in pentane solution, nor upon refluxing with methanolic potassium hydroxide. Carborane, on the other hand, is attacked by the pentane solution of piperidine to form a complex adduct and is degraded by refluxing with methanolic potassium hydroxide to a species containing less than ten boron atoms. It has also been found that the carboxylic acid derivatives of the two isomers differ in strength. Thus potentiometric determinations of the comparative acid strengths of 11-methyl-12-neocarboranyl carboxylic acid M.P. 108–111° C. and 11-methyl-12-carboranyl carboxylic acid MP. 201–203° C. in 50% aqueous ethanol show that the acid derived from carborane was about 50% stronger than the acid derived from neocarborane.

In order to point out more fully the nature of the present invention, the following specific examples are given of illustrative methods of preparing neocarborane and various of its carbon-substituted derivatives, i.e., compounds comprising a neocarborane nucleus with various aliphatic substituents on the carbon atoms thereof.

EXAMPLE 1.—NEOCARBORANE

A 110 ml. stainless steel autoclave was charged at room temperature with 2.5 grams of carborane. The autoclave was sealed under an argon atmosphere at atmospheric pressure and was then heated for two days at temperatures from 465° C. to 500° C. After cooling, the autoclave was opened and the crude product was removed. The crude product was then sublimed to give 2.10 grams of pure neocarborane having a melting point of 263.5 to 265° C. by the sealed tube method. This compares with a melting point of 287° to 288° C. for carborane.

EXAMPLE 2.—NEOCARBORANE

A 300 ml. stainless steel autoclave was charged with 35 grams of carborane having a melting point of 287 to 288° C. under a nitrogen atmosphere and then heated for two days at a temperature of 476° C. to 490° C. After cooling the autoclave was opened and 30 grams of crude neocarborane was removed. The crude neocarborane was recrystallized from hexane and dried to give 19.07 grams of neocarborane having a melting point of 264° to 266° C. by the sealed tube method. An ultimate analysis of the product gave the following results.

Calculated for $C_2H_{12}B_{10}$: C, 16.64; H, 8.38; B, 74.97. Found: C, 16.85; H, 8.15; B, 74.12.

The infra-red spectrum of the neocarborane thus produced was determined and compared with that of carborane. Referring to FIGURES 1 and 2, it is apparent that there are substantial differences in the position and number of the absorption maxima, particularly in the 8 to 11 micron region.

EXAMPLE 3.—11-METHYLNEOCARBORANE

A 300 ml. stainless steel autoclave was charged with 30 grams of methylcarborane having a melting point of 218° to 219° C. in a nitrogen atmosphere and then heated for two days at 472° C. After cooling the autoclave was opened and 29.6 grams of crude methylneocarborane was removed. The crude material was recrystallized from hexane to give 20.6 grams of pure 11-methylneocarborane having a melting point of 208° to 209.5° C. by the sealed tube method. The product was analyzed with the following results.

Calculated for $C_3H_{14}B_{10}$: C, 22.78; H, 8.86; B, 68.35. Found: C, 21.09; H, 9.27; B, 67.6.

The infra-red spectrum of the purified 11-methylneocarborane was determined and compared with that of 11-methylcarborane. Referring to FIGURES 3 and 4, it will be noted that there is a substantial difference in the position of the absorption maxima of the two compounds in the neighborhood of 8–11 microns.

EXAMPLE 4.—11-METHYLNEOCARBORANE

A Carius tube was charged with 1 gram of methylcarborane in an argon atmosphere and then sealed under reduced pressure (0.1 mm. Hg). The tube was heated in a Carius furnace for 18 hours at 400° C. After cooling the product was removed and found to have a melting point of 208° to 210° C. The product was shown to be 11-methylneocarborane.

EXAMPLE 5.—11-METHYLNEOCARBORANE

To 7.2 grams (0.05 mol) of neocarborane in 100 ml. of anhydrous ethyl ether there was added 0.05 mol of n-butyllithium at 0 to 5° C. over a 30 minute period. When addition was complete 7.1 grams (0.05 mol) of methyl iodide in 20 ml. of ethyl ether was added. The reaction mixture was refluxed for two hours at 40° C. and then hydrolyzed by pouring over a mixture of ice and hydrochloric acid. The ether layer was separated and washed with an aqueous solution of sodium thiosulfate, separated and dried. Removal of the ether solvent gave a solid which after sublimation gave 3.06 grams of 11-methylneocarborane. This corresponded to a 38.7% yield. The product was shown to be identical to the product of Example 3 by a comparison of the infra-red spectra of the two products.

EXAMPLE 6.—11,12-BIS (HYDROXYMETHYL) NEOCARBORANE

To 0.076 mol of n-butyllithium in 100 ml. of ethyl ether there was added a solution of 5.50 grams (0.0382 mol) of neocarborane in 100 ml. of ethyl ether at −5° C. The reaction mixture was allowed to warm to room temperature and 2.88 grams of paraformaldehyde was added. Then the reaction mixture was refluxed for 2 hrs. and subsequently acidified by pouring over a mixture of ice and hydrochloric acid. The ether layer was separated and dried. The solvent was removed and the crude material comprising 6.1 grams was recrystallized three times from toluene to give 1.44 grams of pure 11,12-bis-(hydroxymethyl)neocarborane, M.P. 193°–195° C.

Calculated for $C_4B_{10}H_{12}O_4$: B, 52.94; C, 23.52; H, 7.84. Found: B, 52.82; C, 22.14; H, 7.59.

The infra-red spectrum of the 11,12-bis-(hydroxymethyl) neocarborane as thus prepared was determined and compared with that of the corresponding carborane derivative. Referring to FIGURES 5 and 6 of the drawings, it is evident that there is a substantial difference in transmittance in the neighborhood of wave number 1150, and that in general the configurations of the two curves are significantly different in the 8–11 micron region.

EXAMPLE 7.—11,12-BIS (HYDROXYMETHYL) NEOCARBORANE

To 0.08 mol of butyllithium in 100 ml. of dry benzene was added a solution of 5.76 grams (0.04 mol) of neocarborane in 100 ml. of benzene at 50° C. When addition was complete, 2.40 grams of paraformaldehyde was added and the temperature of the reaction mixture was maintained at 70° C. for 2 hrs. The reaction mixture was acidified by pouring over a mixture of ice and hydrochloric acid. The benzene layer was separated and the aqueous layer extracted with ethyl ether. The combined organic extracts were dried over sodium sulfate. Evaporation of the solvents gave a crude solid which after recrystallization from toluene gave 2.00 grams (a 24% yield) of 11,12-bis(hydroxymethyl) neocarborane, M.P. 194°–196° C.

EXAMPLE 8.—11,12-NEOCARBORANYLDI-CARBOXYLIC ACID

To 0.1875 mol of butyllithium in 100 ml. of anhydrous ethyl ether there was added a solution of 13.50 grams (0.094 mol) of neocarborane in 100 ml. of ethyl ether at 0° to 5° C. After the addition was completed, the reaction mixture was stirred for another 0.5 hr. and then excess gaseous carbon dioxide was bubbled into the reaction mixture. The reaction mixture was then acidified with concentrated hydrochloric acid. The organic layer was separated and dried over sodium sulfate. The solvent was removed in vacuo to give a crude solid. The product was recrystallized several times from ethylene dichloride to give 16.94 grams (a 78% yield) of 11,12-neocarboranyldicarboxylic acid, M.P. 202°–204° C.

Calculated for $C_4B_{10}H_{12}O_4$: C, 20.69; H, 5.17; B, 46.55; Neut. Eq., 116. Found: C, 21.12; H, 5.36; B, 47.2; Neut. Eq., 120.

EXAMPLE 9.—DIMETHYL-11,12-NEOCAR-BORANYLDICARBOXYLATE

Anhydrous hydrogen chloride was bubbled through a refluxing solution of 10.00 grams (0.0431 mol) of 11,12-neocarboranyldicarboxylic acid in 200 ml. of absolute methanol for 6 hrs. The reaction mixture was then concentrated to 75 ml. by distillation of the solvent and then 125 ml. of water was added. The water-insoluble oil which formed was extracted with ethyl ether. The ether layer was separated and dried over sodium sulfate. Removal of the solvent gave a viscous oil. Vacuum distillation gave 5.42 grams (48% yield) of dimethyl 11,12-neocarboranyldicarboxylate, B.P. 110° C./0.7 mm., M.P. 52.5°–54° C. Analysis of the product as dimethyl 11,12-neocarboranyldicarboxylate gave the following results.

Calculated: C, 27.69; H, 6.15. Found: C, 27.33; H, 6.32.

EXAMPLE 10.—11-METHYL-12-NEOCARBOR-ANYLCARBOXYLIC ACID

To 9.48 grams (0.06 mol) of 11 methylneocarborane in 150 ml. of anhydrous ethyl ether there was added 0.06 mol of butyllithium at 0° to 5° C. After the addition was completed, the reaction mixture was stirred for another 0.5 hr. Then an excess of carbon dioxide gas was bubbled through the reaction mixture. This was followed by acidification with aqueous hydrochloric acid. The ether layer was separated and dried over sodium sulfate. Removal of the solvent gave a crude solid which was recrystallized from benzene and then hexane to yield 2.26 grams (18.6% yield) of 11-methyl-12-neocarboranyl-carboxylic acid, M.P. 108°–111° C.

Calculated for $C_4H_{14}B_{10}O_2$: C, 23.74; H, 6.97; B, 53.48; Neut. Eq., 202.30. Found: C, 23.68; H, 7.10; B, 53.19; Neut. Eq., 212.

EXAMPLE 11.—ISOPROPYLNEOCARBORANE 10 ml. of isopropylcarborane was heated in a sealed autoclave under an atmosphere of nitrogen gas at 415° C. for 26 hours. The autoclave was then opened and found to contain, in addition to unconverted isopropyl carborane, small amounts of hydrogen, methane, ethane, ethylene, propane, propylene, neocarborane; and approximately 50% by volume of isopropylneacorborane.

After removal of the contaminant gases, the liquid crude product was distilled in a spinning band apparatus. The purified neocarborane was then analyzed by infra-red gas chromatographic methods. Also certain physical properties of the isopropylneocarborane were determined and compared with those of isopropylcarborane as follows.

| | B.P., ° C. | M.P., ° C. | Density, gr./ml. | $n_D^{25}$ |
|---|---|---|---|---|
| Isopropylcarborane | 100 (mm.) | −4 | 0.927 | 1.5395 |
| Isopropylneocarborane | 57° (10 mm.) | ca+1 | 0.890 | 1.5306 |

The infra-red spectra of isopropylneocarborane and isopropylcarborane are given in FIGURES 7 and 8 respectively of the drawings. These curves show substantial differences in transmittance between the two products, particularly in the wave number range of 725 to 1500.

EXAMPLE 12.—11,12-NEOCARBORANYL-DICARBOXYLCHLORIDE

To 10.47 grams (0.0504 mol) of $PCl_5$ a solution of 6.00 grams (0.0252 mol) of 11,12-neocarboranyldicarboxylic acid in 150 ml. of ethyl ether was added. The reaction mixture was refluxed for approximately five hours and then the ether was distilled. The residual crude liquid was distilled at 86° C. at 0.5 mm. absolute pressure to yield 4.72 grams (70% yield) of the diacid chloride. The index of refraction of the product was $N_D^{26°\,C.}$ 1.5458.

Analysis calculated for Cl _____ 26.12
Found _____ 25.01

EXAMPLE 13.—11,12-NEOCARBORANYL-DICARBOXAMIDE 11,12-neocarboranyldicarbonyl chloride was added to concentrated $NH_4OH$ with stirring. The precipitate was separated by filtration and air dried. Recrystallization of the white solid from a 1:1 solution of benzene and ethyl-acetate yielded the pure diamide, M.P. 184°–185.5° C. Analysis of the product gave the following results.

Calculated: B, 46.95; C, 20.86; H, 6.08; N, 12.17. Found: B, 44.3; C, 20,16; H, 6.15; N, 13.03.

It is of course to be understood that the foregoing examples are illustrative only and that numerous changes can be made in the ingredients, proportions and conditions specifically referred to therein without departing from the spirit of the invention as set forth in the appended claims.

We claim:
1. As new compositions of matter, neocarborane and carbon-substituted derivatives thereof selected from the group consisting of alkyl, hydroxyalkyl, carboxyl, carboxy ester, carboxyl chloride and carboxamide derivatives.
2. Neocarborane.
3. 11-methylneocarborane.
4. 11,12-bis(hydroxymethyl) neocarborane.
5. 11,12-neocarboranyl dicarboxylic acid.
6. 11-methyl-12-neocarboranyl carboxylic acid.
7. Dimethyl-11,12-neocarboranyl dicarboxylate.
8. The method of making an organo-borane which comprises heating a carborane compound selected from the group consisting of carborane and alkylcarboranes to a temperature of 400° to 500° C. to isomerize said carborane compound to a corresponding neocarborane compound.
9. The method of making an organo-borane which comprises heating carborane to a temperature of 400° to 500° C. to isomerize said carborane to neocarborane.
10. The method of making an organo-borane which comprises heating methylcarborane to a temperature of 400° to 500° C. to isomerize said methylcarborane to methylneocarborane.
11. A method according to claim 9 and wherein the neocarborane formed is reacted with butyllithium to form dilithium neocarborane and the dilithium neocarborane is reacted with paraformaldehyde to form 11,12-bis(hydroxy methyl) neocarborane.

12. A method according to claim 9 and wherein the neocarborane formed is reacted with butyllithium to form dilithium neocarborane, and the dilithium neocarborane is reacted with carbon dioxide gas to form 11,12-neocarboranyl dicarboxylic acid.

13. The method according to claim 12 and wherein said dicarboxylic acid is reacted with methanol to form a dimethyl ester thereof.

14. 11,12-neocarboranyldicarboxyl chloride.

15. 11,12-neocarboranyldicarboxamide.

References Cited by the Examiner
UNITED STATES PATENTS

| | | | |
|---|---|---|---|
| 3,030,423 | 4/1962 | Alley et al. | 260—606.5 |
| 3,078,310 | 2/1963 | Brown | 260—606.5 |
| 3,078,312 | 2/1963 | Brown | 260—606.5 |
| 3,102,138 | 8/1963 | Ager et al. | 260—526 |

TOBIAS E. LEVOW, *Primary Examiner.*

LEON D. ROSDOL, LEON ZITVER, *Examiners.*